United States Patent
Hu et al.

(10) Patent No.: US 12,418,236 B2
(45) Date of Patent: Sep. 16, 2025

(54) DUAL OUTPUT ENERGY CONVERSION DEVICE, MODULATION METHOD AND POWER SUPPLY DEVICE

(71) Applicant: GPOWER SEMICONDUCTOR, INC., Jiangsu (CN)

(72) Inventors: Mao Hu, Jiangsu (CN); Yi Pei, Jiangsu (CN)

(73) Assignee: GPOWER SEMICONDUCTOR, INC., Jiangsu (CN)

(*) Notice: Subject to any disclaimer, the term of this patent is extended or adjusted under 35 U.S.C. 154(b) by 269 days.

(21) Appl. No.: 18/250,906

(22) PCT Filed: Oct. 28, 2021

(86) PCT No.: PCT/CN2021/127098
§ 371 (c)(1),
(2) Date: Apr. 27, 2023

(87) PCT Pub. No.: WO2022/089543
PCT Pub. Date: May 5, 2022

(65) Prior Publication Data
US 2023/0396185 A1    Dec. 7, 2023

(30) Foreign Application Priority Data
Oct. 28, 2020 (CN) .......................... 202011177447.8

(51) Int. Cl.
*H02M 1/44* (2007.01)
*H02J 3/38* (2006.01)
(Continued)

(52) U.S. Cl.
CPC ................. *H02M 1/44* (2013.01); *H02J 3/38* (2013.01); *H02M 1/008* (2021.05); *H02M 1/009* (2021.05);
(Continued)

(58) Field of Classification Search
CPC .... H02M 1/0067; H02M 1/007; H02M 1/008; H02M 1/009; H02M 1/44; H02M 7/483; H02M 7/53871
See application file for complete search history.

(56) References Cited

U.S. PATENT DOCUMENTS

| | | | |
|---|---|---|---|
| 9,584,034 B2* | 2/2017 | Deboy | H02M 3/33584 |
| 2009/0195071 A1* | 8/2009 | Furuse | H02M 3/156 |
| | | | 307/31 |
| 2016/0241039 A1 | 8/2016 | Cheng et al. | |

FOREIGN PATENT DOCUMENTS

| | | |
|---|---|---|
| CN | 1064178 A | 9/1992 |
| CN | 102711346 A | 10/2012 |

(Continued)

OTHER PUBLICATIONS

PCT International Search Report and Written Opinion, Application No. PCT/CN2021/127098, dated Jan. 26, 2022, 9 pages: with English translation.

*Primary Examiner* — Gary L Laxton
(74) *Attorney, Agent, or Firm* — Armstrong Teasdale LLP

(57) ABSTRACT

The present disclosure discloses a dual output energy conversion device, modulation method, and power supply device which can enhance the bus voltage boosting capability of the conversion device by using a first electric energy storage module, so that it can be used in a wider input voltage range. A first conversion output circuit and a second conversion output circuit are set, and voltage stress of all switching tubes is reduced to half of the direct current bus voltage, which can greatly reduce the system EMI of the conversion device in high-frequency applications, and improve the power conversion efficiency of the device. The dual output energy conversion device only needs to realize the control of one-stage power conversion, and has a simple control structure.

10 Claims, 10 Drawing Sheets

(51) Int. Cl.
*H02M 1/00* (2006.01)
*H02M 7/483* (2007.01)
*H02M 7/5387* (2007.01)

(52) U.S. Cl.
CPC ....... *H02M 7/483* (2013.01); *H02M 7/53871* (2013.01)

(56) References Cited

FOREIGN PATENT DOCUMENTS

| | | |
|---|---|---|
| CN | 103001523 A | 3/2013 |
| CN | 107070227 A | 8/2017 |

\* cited by examiner

DUAL OUTPUT ENERGY CONVERSION DEVICE, MODULATION METHOD AND POWER SUPPLY DEVICE

CROSS REFERENCE TO RELATED APPLICATIONS

This patent application is a National Stage Entry of PCT/CN2021/127098 filed on Oct. 28, 2021, which claims the benefit and priority of Chinese Patent Application No. 202011177447.8 filed on Oct. 28, 2020, the disclosures of which are incorporated by reference herein in their entirety as part of the present application.

BACKGROUND

The present disclosure relates to the technical field of inverter, and particularly relates to a dual output energy conversion device, a modulation method, and a power supply device.

In new energy power generation occasions, such as photovoltaic power generation, wind power generation, etc., the inverter is a key device for effectively realizing electric energy conversion. The inverter device in the new energy power generation occasions mainly has two characteristics: wide output voltage range of the power supply and multi-port output. In order to adapt to the application characteristics, the inverter device usually needs to have the ability to change the buck-boost power, and multi-port output, as well as flexible capacity expansion. The former often uses two-stage or multi-stage buck-boost power conversion devices, while the latter generally uses multiple power conversion devices in parallel, or realizes single input and multiple outputs through isolated circuits.

Both of the above two solutions require more circuit components and complex control solutions, and the voltage stress on the circuit will be high. Moreover, excessive voltage stress may generate a high instantaneous current during the switching operation of the power tube, worsen the Electromagnetic Interference (EMI) of the power supply device, and even reduce the power conversion efficiency of the device, which seriously restricts the application of wide bandgap semiconductor devices such as Group III nitrides.

BRIEF DESCRIPTION

Embodiments of the present disclosure include, for example, providing a dual output energy conversion device, a modulation method, and a power supply device, which can reduce the voltage stress of the circuit and improve the power conversion efficiency of the device.

Embodiments of the present disclosure can be realized as follows:

In a first aspect, an embodiment of the present disclosure provides a dual output energy conversion device, wherein the dual output energy conversion device includes a first energy storage module, a first combined series bridge arm module, a capacitive energy storage module, and a second combined series bridge arm module, the first energy storage module, the first combined series bridge arm module, the capacitive energy storage module, and the second combined series bridge arm module are connected in sequence, the first combined series bridge arm module includes a first main switching tube bridge arm unit and a first auxiliary tube bridge arm unit connected in series, the second combined series bridge arm module includes a second main switching tube bridge arm unit and a second auxiliary tube bridge arm unit connected in series, the first main switching tube bridge arm unit and the second main switching tube bridge arm unit form a first conversion output circuit, outputting energy of the first energy storage module, and/or the capacitive energy storage module to a subsequent load, and the first auxiliary tube bridge arm unit and the second auxiliary tube bridge arm unit form a second conversion output circuit, outputting energy of the first energy storage module, and/or the capacitive energy storage module to a subsequent load.

In an alternative embodiment, the first main switching tube bridge arm unit includes a first main switching tube and a second main switching tube, the first main switching tube being connected in series with the second main switching tube, the second main switching tube bridge arm unit includes a third main switching tube and a fourth main switching tube, the third main switching tube being connected in series with the fourth main switching tube, the capacitive energy storage module includes a first bus capacitor, a first end of the first bus capacitor is electrically connected to the first main switching tube and the third main switching tube, and a second end of the first bus capacitor is electrically connected to the second main switching tube and the fourth main switching tube, the first conversion output circuit includes a first output terminal and a second output terminal, the first output terminal is formed at midpoint of the first main switching tube bridge arm unit, and the second output terminal is formed at midpoint of the second main switching tube bridge arm unit, and the first main switching tube, the second main switching tube, the third main switching tube and the fourth main switching tube are used to switch conduction state according to a driving signal, so that energy of the first energy storage module and the first bus capacitor is outputted through the first output terminal and the second output terminal as an alternating signal to a subsequent load.

In an alternative embodiment, the first auxiliary tube bridge arm unit includes a first auxiliary tube and a second auxiliary tube, the first auxiliary tube being connected in series with the second auxiliary tube, the second auxiliary tube bridge arm unit includes a third auxiliary tube and a fourth auxiliary tube, the third auxiliary tube being connected in series with the fourth auxiliary tube, the capacitive energy storage module includes a second bus capacitor connected in series with the first bus capacitor, a first end of the second bus capacitor is electrically connected to a second end of the first bus capacitor, the first end of the second bus capacitor is further electrically connected to the second auxiliary tube and the fourth auxiliary tube, and the second end of the second bus capacitor is electrically connected to the first auxiliary tube and the third auxiliary tube, the second conversion output circuit includes a third output terminal and a fourth output terminal, the third output terminal is formed at midpoint of the first auxiliary tube bridge arm unit, and the fourth output terminal is formed at midpoint of the second auxiliary tube bridge arm unit, and the first auxiliary tube, the second auxiliary tube, the third auxiliary tube, and the fourth auxiliary tube are used to switch conduction state according to a driving signal, so that energy of the first energy storage module and the second bus capacitor is outputted through the third output terminal and the fourth output terminal as an alternating signal to a subsequent load.

In an alternative embodiment, the dual output energy conversion device further includes a first filtering module and a second filtering module, the first filtering module is electrically connected to the output terminal of the first conversion output circuit, and is used to convert an alternating signal output by the first conversion output circuit into a standard sinusoidal signal, and the second filtering module is electrically connected to the output terminal of the second conversion output circuit, and is used to convert an alternating signal output by the second conversion output circuit into a standard sinusoidal signal.

In an alternative embodiment, the dual output energy conversion device includes a first reverse flow preventing module, and the first reverse flow preventing module is arranged between the first energy storage module and the first conversion output circuit, and the first reverse flow preventing module is used to prevent energy backflow of the first conversion output circuit.

In an alternative embodiment, the dual output energy conversion device includes a second reverse flow preventing module, and the second reverse flow preventing module is arranged between the second conversion output circuit and negative pole of a power supply, and the second reverse flow preventing module is used to prevent energy backflow of the second conversion output circuit.

In an alternative embodiment, the first energy storage module is arranged between positive pole of the power supply and the first conversion output circuit, and the first energy storage module includes at least one diode, and the first energy storage module further includes at least one of an inductor and a capacitor.

In an alternative embodiment, switch tubes in the first combined series bridge arm module and the second combined series bridge arm module are Group-III nitride transistors.

In a second aspect, an embodiment of the present disclosure provides a modulation method, wherein the modulation method is applied to the dual output energy conversion device according to any one of the preceding embodiments, and the modulation method includes comparing a first modulated wave input signal with a first carrier input signal and a second carrier input signal to generate a first sinusoidal pulse width signal and a second sinusoidal pulse width signal, comparing a second modulated wave input signal with the first carrier input signal and the second carrier input signal to generate a second fixed pulse width signal and a second fixed pulse width signal, generating a first zero-crossing point detection signal and a second zero-crossing point detection signal by comparing the first modulated wave input signal and the second modulated wave input signal with a driving reference ground signal respectively, generating driving signals Vgs1-Vgs4 of the first conversion output circuit through a first combinational logic module according to the first sinusoidal pulse width signal, a first fixed pulse width signal and the first zero-crossing point detection signal, generating driving signals Vgsub1-Vgsub4 of the second conversion output circuit through a second combinational logic module according to the second sinusoidal pulse width signal, a second fixed pulse width signal and the second zero-crossing point detection signal, driving the first conversion output circuit according to the driving signals Vgs1-Vgs4 of the first conversion output circuit, and driving the second conversion output circuit according to the driving signals Vgsub1-Vgsub4 of the second conversion output circuit, wherein a phase difference between the first carrier input signal and the second carrier input signal is 180°.

In a third aspect, an embodiment of the present disclosure provides a power supply device, wherein the power supply device includes the dual output energy conversion device according to any one of the preceding embodiments.

Compared with the prior art, the dual output energy conversion device, modulation method, and power supply device provided by the present disclosure can greatly enhance the bus voltage boosting capability of the conversion device by using a first energy storage module, so that it can be used in a wider input voltage range, a first conversion output circuit and a second conversion output circuit are set, and voltage stress of all switching tubes is reduced to half of the direct current bus voltage, which can greatly reduce the system EMI of the conversion device in high-frequency applications, and improve the power conversion efficiency of the device, compared with the traditional multi-stage structure, which needs to realize the midpoint voltage clamping and other controls of the front stage and the rear stage at the same time and has a complex control structure, the dual output energy conversion device provided by the present disclosure only needs to realize the control of one-stage power conversion, and has a simple control structure.

BRIEF DESCRIPTION OF THE DRAWINGS

In order to more clearly illustrate the technical solution of the embodiments of the present disclosure, a brief introduction will be given below regarding the drawings that need to be used in the embodiments. It should be understood that the following drawings only show some embodiments of the present disclosure and should not be regarded as limiting the scope. Ordinary skilled artisans in the art can obtain other relevant drawings based on these drawings without creative effort.

DETAILED DESCRIPTION

Figure 1:
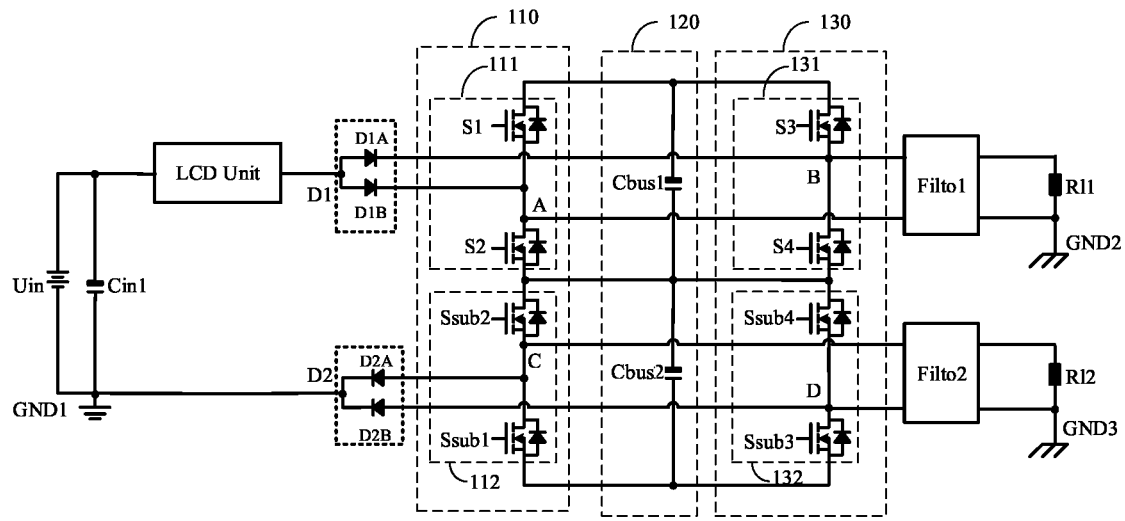
FIG. 1 shows a schematic diagram of the structure of the dual output energy conversion device provided in the present embodiment of the present disclosure.

In order to make the technical solutions and advantages of the embodiments of the present disclosure clearer, the technical solutions in the embodiments of the present disclosure will be clearly and completely described below in conjunction with the accompanying drawings in the embodiments of the present disclosure. Apparently, the described embodiments are some, not all, embodiments of the present disclosure. The components of the embodiments of the present disclosure generally described and illustrated in the drawings herein may be arranged and designed in a variety of different configurations.

In new energy power generation occasions, such as photovoltaic power generation, wind power generation, etc., the inverter is a key device for effectively realizing electric energy conversion. The inverter device in the new energy power generation occasions mainly has two characteristics: (1) wide output voltage range of the power supply, and (2) multi-port output. In order to adapt to the application characteristics, the inverter device usually needs to have the ability to change the buck-boost power, and multi-port output, as well as flexible capacity expansion. The former often uses two-stage or multi-stage buck-boost power conversion devices, while the latter generally uses multiple power conversion devices in parallel, or realizes single input and multiple outputs through isolated circuits.

Both of the above two solutions require more circuit components and complex control solutions, and the voltage stress on the circuit will be high. Especially with the application of the new generation of semiconductor devices, the working frequency of the switching devices will be greatly increased. Moreover, excessive voltage stress may generate a large dv/dt during the switching operation of the power tube, worsen the EMI of the power supply device, and even reduce the power conversion efficiency of the device, which seriously restricts the application of wide bandgap semiconductor devices such as Group III nitrides.

To solve the above shortcomings in the prior art, the present disclosure provides a dual output energy conversion device. Referring to FIG. 1, FIG. 1 shows a schematic diagram of the structure of the dual output energy conversion device provided in the present embodiment.

The dual output energy conversion device includes a power supply input terminal, a first energy storage module LCD Unit, a first combined series bridge arm module 110, a capacitive energy storage module 120, and a second combined series bridge arm module 130.

The first energy storage module LCD Unit, the first combined series bridge arm module 110, the capacitive energy storage module 120, and the second combined series bridge arm module 130 are connected in sequence.

The first energy storage module LCD Unit is electrically connected to the power supply input terminal for receiving power (in this embodiment, the power supply is a DC power supply Uin) and storing energy to boost the bus voltage. The first combined series bridge arm module 110 includes a first main switching tube bridge arm unit 111 and a first auxiliary tube bridge arm unit 112 connected in series. The second combined series bridge arm module 130 includes a second main switching tube bridge arm unit 131 and a second auxiliary tube bridge arm unit 132 connected in series. The first main switching tube bridge arm unit 111 and the second main switching tube bridge arm unit 131 form a first conversion output circuit (not shown), which outputs the energy of the first energy storage module LCD Unit and/or the capacitive energy storage module 120 as an alternating signal to subsequent load. The first auxiliary tube bridge arm unit 112 and the second auxiliary tube bridge arm unit 132 form a second conversion output circuit (not shown), which outputs the energy of the first energy storage module LCD Unit and/or the capacitive energy storage module 120 as an alternating signal for subsequent load.

The technical solution provided by present embodiment that utilizes the first energy storage module LCD Unit may significantly improve the voltage boosting capacity of the energy conversion device, enabling it to be used within a wider input voltage range. By setting up an auxiliary tube and a main switching tube to form two conversion output loops, the main switching tube is responsible for energy conversion in the first conversion output loop, while the auxiliary tube is responsible for energy conversion in the second conversion output loop, thereby forming a dual output circuit. At the same time, the auxiliary tube is used to share the voltage stress of the main switching tube and reduce the voltage stress on the system, which only needs to realize the control of one-stage power conversion, and has a simple control structure.

In a possible implementation, continuing referring to FIG. 1, the first main switching tube bridge arm unit 111 includes a first main switching tube S1 and a second main switching tube S2, while the second main switching tube bridge arm unit 131 includes a third main switching tube S3 and a fourth main switching tube S4, with the first main switching tube S1 and the second main switching tube S2 connected in series, and the third main switching tube S3 and the fourth main switching tube S4 connected in series.

In a possible implementation, the capacitive energy storage module 120 includes a first bus capacitor Cbus1, the first end of which (in this embodiment, the first end is the positive pole) is electrically connected to the first main switching tube S1 and the third main switching tube S3, and the second end of which (in this embodiment, the second end is the negative pole) is electrically connected to the second main switching tube S2 and the fourth main switching tube S4.

The first conversion output circuit includes a first output terminal B and a second output terminal A. The first output terminal B is formed at the midpoint of the first main switching tube bridge unit 111, that is, the connection point between the first main switching tube S1 and the second main switching tube S2, and the second output terminal A is formed at the midpoint of the second main switching tube bridge unit 131, that is, the connection point between the third main switching tube S3 and the fourth main switching tube S4. The first main switching tube S1, the second main switching tube S2, the third main switching tube S3, and the fourth main switching tube S4 are used to switch the conduction state according to the driving signal, so as to convert the energy of the first energy storage module LCD Unit and the first bus capacitor Cbus1 and output an alternating signal through the first output terminal B and the second output terminal A to the subsequent load.

In a possible implementation, continuing referring to FIG. 1, the first auxiliary tube bridge unit 112 includes a first auxiliary tube Ssub1 and a second auxiliary tube Ssub2, and the second auxiliary tube bridge unit 132 includes a third auxiliary tube Ssub3 and a fourth auxiliary tube Ssub4, where the first auxiliary tube Ssub1 and the second auxiliary tube Ssub2 are connected in series, and the third auxiliary tube Ssub3 and the fourth auxiliary tube Ssub4 are connected in series.

The capacitive energy storage module 120 includes a second bus capacitor Cbus2, which is connected in series with the first bus capacitor Cbus1. The first end of the second bus capacitor Cbus2 (in this embodiment, the first end is the positive pole) is electrically connected to the second end of the first bus capacitor Cbus1, and also to the second auxiliary tube Ssub2 and the fourth auxiliary tube Ssub4. The second end of the second bus capacitor Cbus2 (in this embodiment, the second end is the negative pole) is electrically connected to the first auxiliary tube Ssub1 and the third auxiliary tube Ssub3.

The second conversion output circuit includes a third output terminal C and a fourth output terminal D. The third output terminal C is formed at the midpoint of the first auxiliary tube bridge arm unit 112, that is, the connection point between the second auxiliary tube Ssub2 and the first auxiliary tube Ssub1, and the fourth output terminal D is formed at the midpoint of the second auxiliary tube bridge arm unit 132, that is, the connection point between the fourth auxiliary tube Ssub4 and the third auxiliary tube Ssub3.

The first auxiliary tube Ssub1, the second auxiliary tube Ssub2, the third auxiliary tube Ssub3, and the fourth auxiliary tube Ssub4 are used to switch conduction states according to the driving signal, so as to convert the energy of the first energy storage module LCD Unit and the second bus capacitor and output an alternating signal through the third output terminal C and the fourth output terminal D to the subsequent load.

In this embodiment, taking the first combined series bridge arm module 110 as an example, the first combined series bridge arm module 110 includes the first main switching tube bridge arm unit 111 and the first auxiliary tube bridge arm unit 112, which are connected in series. The first auxiliary tube bridge arm unit 112 includes the first auxiliary tube Ssub1 and the second auxiliary tube Ssub2, and the second auxiliary tube Ssub2 is connected to the second main switching tube S2. Similarly, the fourth auxiliary tube Ssub4 is connected to the fourth main switching tube S4.

The dual output energy conversion device includes a first reverse flow preventing module D1 and a second reverse flow preventing module D2. The first reverse flow preventing module D1 is disposed between the first energy storage module LCD Unit and the first conversion output circuit, and is used to prevent energy backflow in the first conversion output circuit.

In a possible implementation, the first reverse flow preventing module D1 includes a first reverse flow preventing diode D1A and a second reverse flow preventing diode D1B. The positive poles of the first reverse flow preventing diode D1A and the second reverse flow preventing diode D1B are both connected to the second end of the first energy storage module LCD Unit, and the negative pole of the first reverse flow preventing diode D1A is connected to the first output terminal B; and the negative pole of the second reverse flow preventing diode D1B is connected to the second output terminal A.

The second reverse flow preventing module D2 is disposed between the second conversion output circuit and the negative pole of the power supply and is used to prevent energy backflow in the second conversion output circuit.

In a possible implementation, the second reverse flow preventing module D2 includes a third reverse flow preventing diode D2A and a fourth reverse flow preventing diode D2B. The negative poles of the third reverse flow preventing diode D2A and the fourth reverse flow preventing diode D2B are both electrically connected to the negative pole of the power supply, and the positive pole of the third reverse flow preventing diode D2A is connected to the third output terminal C; and the positive pole of the fourth reverse flow preventing diode D2B is connected to the fourth output terminal D.

In a possible implementation, the first energy storage module LCD Unit is used to store energy when the second main switching tube S2 and the second auxiliary tube Ssub2 are conducting at the same time, or when the fourth main switching tube S4 and the fourth auxiliary tube Ssub4 are conducting at the same time. In other situations, energy is released to the first conversion output circuit, the second conversion output circuit, the first bus capacitor Cbus1, and the second bus capacitor Cbus2.

When the second main switching tube S2 and the second auxiliary tube Ssub2 are conducting at the same time, the first energy storage module LCD Unit is equivalent to two ends are directly connected to the power supply input terminal. When the fourth main switching tube S4 and the fourth auxiliary tube Ssub4 are conducting at the same time, the first energy storage module LCD Unit is equivalent to two ends are directly connected to the power supply input terminal. At the time, the power supply charges the first energy storage module LCD Unit. In other situations, the first energy storage module LCD Unit is in a state of discharge and transfers the stored energy to the load or the first bus capacitor Cbus1 and the second bus capacitor Cbus2.

In a possible implementation, the various switching tubes of the first conversion output circuit, including the first main switching tube S1, the second main switching tube S2, the third main switching tube S3, and the fourth main switching tube S4, are used to conduct or turn off according to the control of the driving signal, in order to output alternating pulse signals through the first output terminal and the second output terminal based on the energy of the first energy storage module LCD Unit and/or the energy of the first bus capacitor Cbus1.

The various switching tubes of the second conversion output circuit, including the first auxiliary tube Ssub1, the second auxiliary tube Ssub2, the third auxiliary tube Ssub3, and the fourth auxiliary tube Ssub4, are used to conduct or turn off according to the control of the driving signal, in order to output alternating pulse signals through the third output terminal and the fourth output terminal based on the energy of the first energy storage module LCD Unit and/or the energy of the second bus capacitor Cbus2.

In a possible implementation, the dual output energy conversion device further includes the first filter module Filto1 and the second filter module Filto2.

The first filtering module Filto1 is electrically connected to the first conversion output circuit, and is used to convert the pulse signal output from the first conversion output circuit into a sinusoidal pulse signal. The first filtering module Filto1 includes a first input terminal and a second input terminal, where the first input terminal of the first filtering module Filto1 is electrically connected to the first output terminal B of the first conversion output circuit, and the second input terminal of the first filtering module Filto1 is electrically connected to the second output terminal A of the first conversion output circuit.

The second filtering module Filto2 is electrically connected to the second conversion output circuit, and is used to convert the pulse signal output from the second conversion output circuit into a sinusoidal pulse signal. The second filtering module Filto2 includes a first input terminal and a second input terminal, where the first input terminal of the second filtering module Filto2 is electrically connected to the third output terminal C of the second conversion output circuit, and the second input terminal of the second filtering module Filto2 is electrically connected to the fourth output terminal D of the second conversion output circuit.

In a possible implementation, the first filtering module Filto1 and the second filtering module Filto2 may be one of an L-type filtering module, an L-C-type filtering module, and an L-C-L-type filtering module.

The first energy storage module LCD Unit is a boost module consisting of at least two different components, for example, the first energy storage module LCD Unit includes at least one diode, and also includes at least one of an inductor and a capacitor.

Figure 9A:
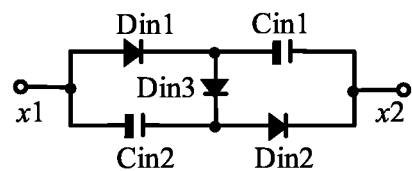
FIGS. 9A to 9C show schematic diagrams of the first energy storage module provided in the present embodiment of the present disclosure.
Figure 9B:
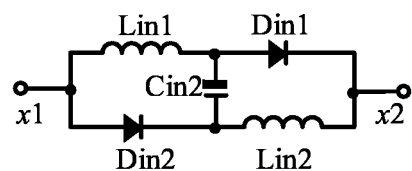
Figure 9C:
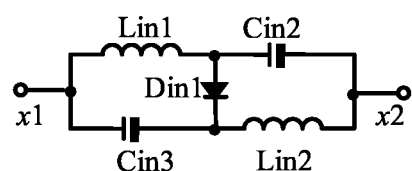

In a possible implementation, the first energy storage module LCD Unit may also be composed of several capacitors and diodes, as shown in FIG. 9A. In some other possible implementations, the first energy storage module LCD Unit may also be composed of several inductors, capacitors, and diodes, as shown in FIG. 9B and FIG. 9C.

In a possible implementation, the dual output energy conversion device further includes an input capacitor, where the first end of the input capacitor is electrically connected to the positive terminal of the power supply, and the second end of the input capacitor is electrically connected to the negative terminal of the power supply. The input capacitor is used to absorb the peak voltage output from the power supply output terminal, and to make the DC signal waveform output from the power supply output terminal smoother.

The operation principle of the modulation method for the dual output energy conversion device provided in this embodiment will be described below in conjunction with the accompanying drawings.

The modulation method includes:

Step 110: Comparing a first modulated wave input signal with a first carrier input signal and a second carrier input signal respectively to generate a first sinusoidal pulse width signal and a second sinusoidal pulse width signal.

Step 120: Comparing a second modulated wave input signal with the first carrier input signal and the second carrier input signal respectively to generate a second fixed pulse width signal and a second fixed pulse width signal.

Step 130: Generating a first zero-crossing point detection signal and a second zero-crossing point detection signal by comparing the first modulated wave input signal and the second modulated wave input signal with a driving reference ground signal respectively.

Step 140: Generating driving signals Vgs1-Vgs4 of the first conversion output circuit through a first combinational logic module according to the first sinusoidal pulse width signal, a first fixed pulse width signal and the first zero-crossing point detection signal.

Step 150: Generating driving signals Vgsub1-Vgsub4 of the second conversion output circuit through a second combinational logic module according to the second sinusoidal pulse width signal, a second fixed pulse width signal and the second zero-crossing point detection signal.

Step 160: Driving the first conversion output circuit according to the driving signals Vgs1-Vgs4 of the first conversion output circuit.

Step 170: Driving the second conversion output circuit according to the driving signals Vgsub1-Vgsub4 of the second conversion output circuit.

Therein, a phase difference between the first carrier input signal and the second carrier input signal is 180°.

Specifically, the modulation signal of the dual output energy conversion device includes a first carrier input signal Vtri1, a second carrier input signal Vtri2, a first modulation wave input signal Vsine, a second modulation wave input signal Vdc, first to fifth comparison modules Comp1 to Comp5, a first combinational logic module Log1, a second combinational logic module Log2, and tube output driving signals Vgs1 to Vgs4 of first to fourth main switching tube, and first to fourth three-level auxiliary tube driving signals Vgsub1 to Vgsub4.

The phase difference between the first carrier input signal Vtri1 and the second carrier input signal Vtri2 is 180°. The first carrier input signal Vtri1 and the second carrier input signal Vtri2 are both sawtooth wave signals. The first modulation wave input signal Vsine is a sinusoidal wave signal, and the second modulation wave input signal Vdc is a DC signal.

The first modulation wave input signal Vsine and the first carrier input signal Vtri1 generate a first sinusoidal pulse width signal Vspwm1 through the first comparison module Comp1. The second modulation wave input signal Vdc and the first carrier input signal Vtri1 generate a first fixed pulse width signal Vpwm1 through the second comparison module Comp1. The first modulation wave input signal Vsine and the drive reference ground signal AGND generate a zero-crossing point detection signal Vzero through the fifth comparison module Comp5. The first sinusoidal pulse width signal Vspwm1, the first fixed pulse width signal Vpwm1, and the zero-crossing point detection signal Vzero generate tube output driving signals Vgs1 to Vgs4 of first to fourth main switching tube through the first combinational logic module Log1.

Similarly, a first sinusoidal pulse width signal Vspwm2, a first fixed pulse width signal Vpwm2 and a zero-crossing point detection signal Vzero may be generated from a first modulated wave input signal Vsine, a second carrier input signal Vtri2, and a second modulated wave input signal Vdc through a third comparison module Comp3, a fourth comparison module Comp4, and a fifth comparison module Comp5, and first to fourth three-level auxiliary tube driving signals Vgsub1 to Vgsub4 are generated by a second combinational logic module Log2.

Figure 2A:
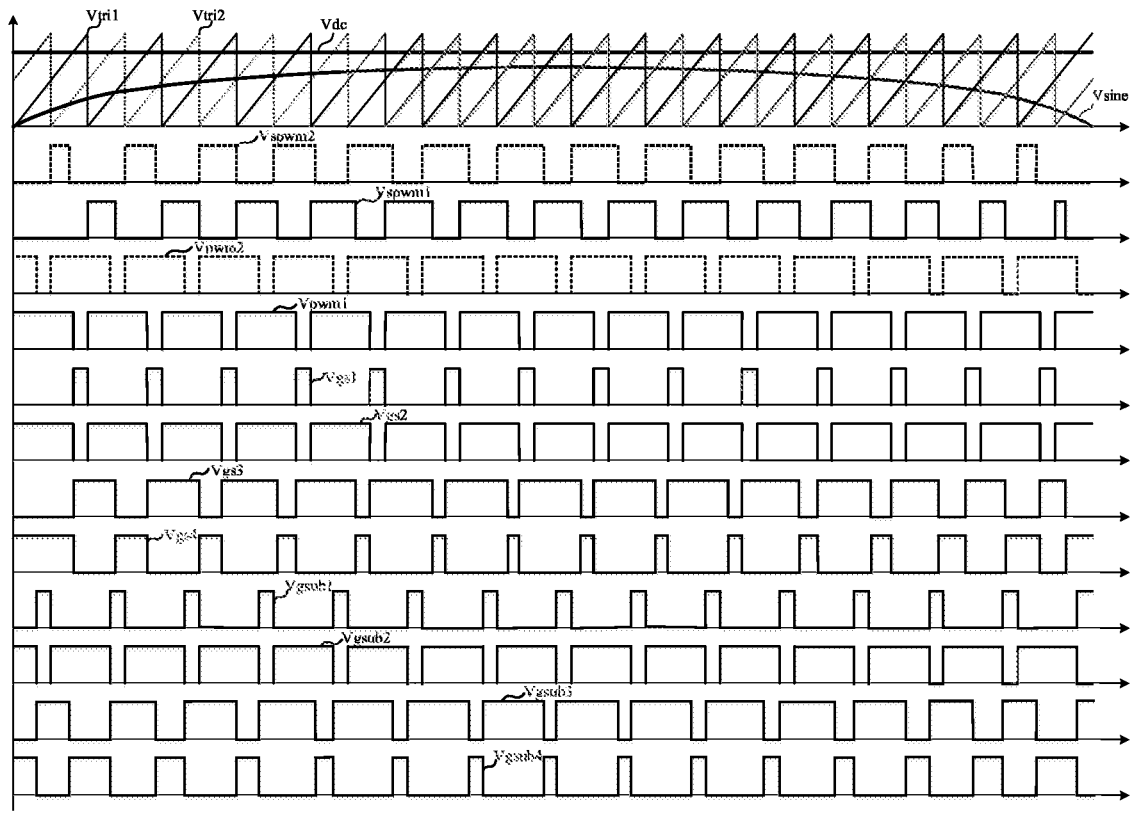
FIG. 2A shows a modulation key waveform diagram (D>0.5) provided in the present embodiment of the present disclosure.
Figure 2B:
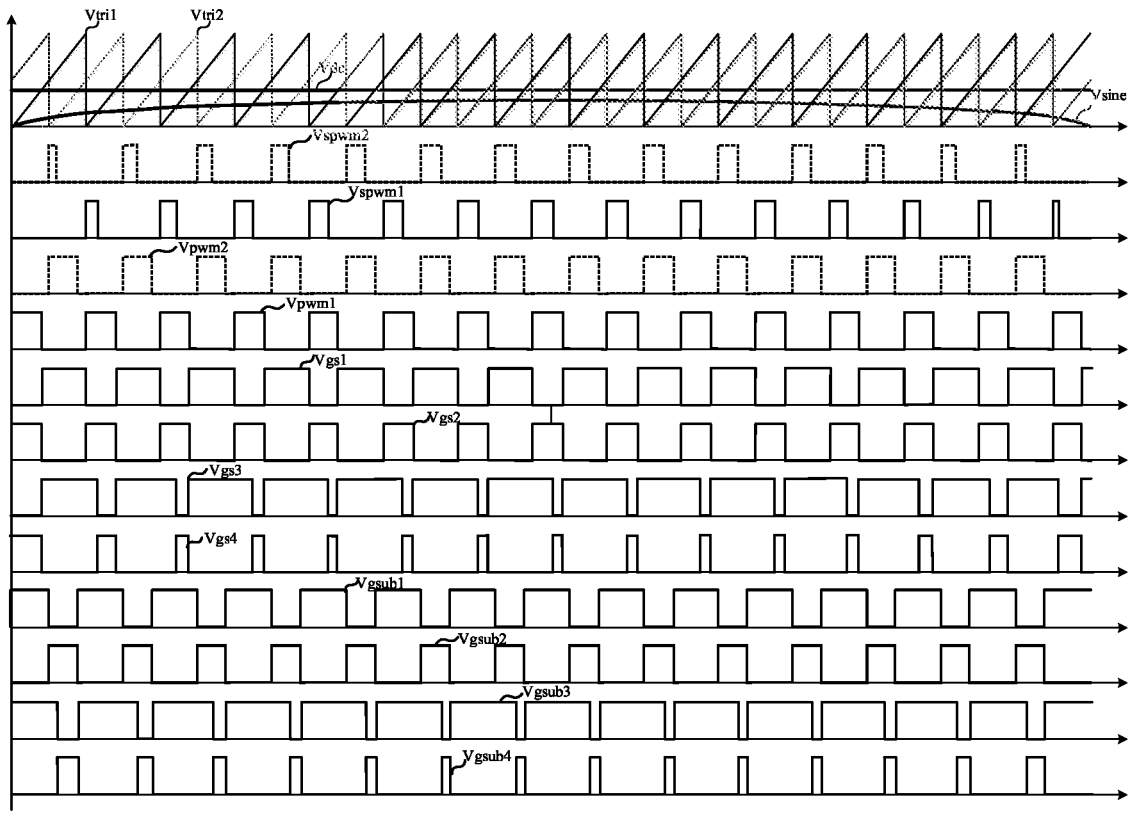
FIG. 2B shows a modulation key waveform diagram (D<0.5) provided in the present embodiment of the present disclosure.

The boost and buck capability of the dual output energy conversion device depends on the value of duty ratio D of the first fixed pulse width signal Vpwm1 (or the second fixed pulse width signal Vpwm2), which is divided into two cases: D>0.5 and D<0.5. Modulation key waveforms (sinusoidal positive half cycle) are shown in FIGS. 2A to 2B. In view of the symmetry of positive and negative half-cycle modulation, only the key waveforms of positive half-cycle modulation are given in this embodiment.

Referring to FIGS. 3A to 3H, they respectively show different operating states of the dual output energy conversion device under eight boost modes with reference to the modulation signal shown in FIG. 2A.

Figure 3A:
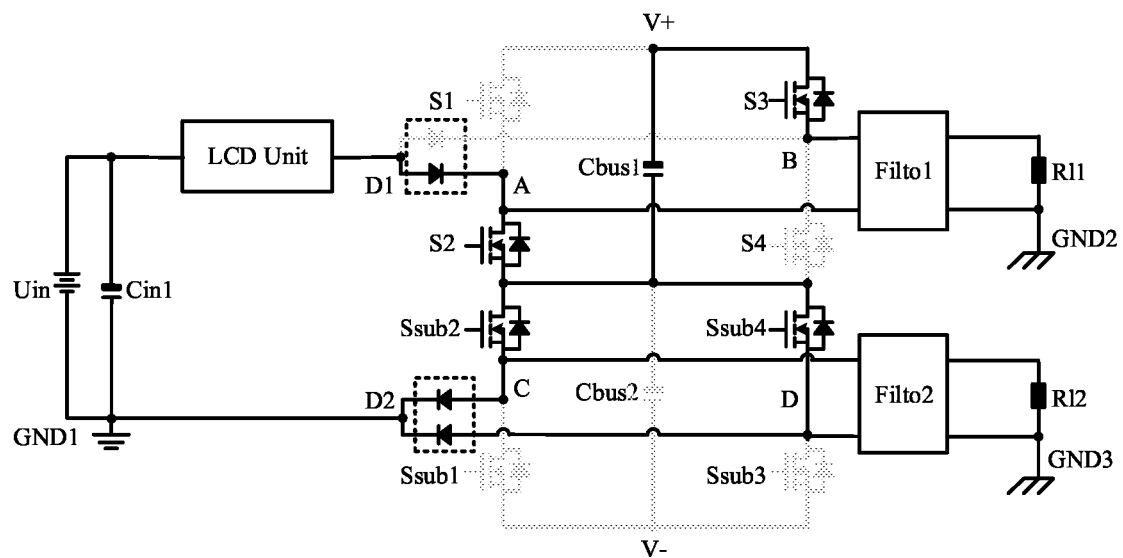
FIGS. 3A to 3H show the boost inverter (D>0.5) operating mode diagrams of the dual output energy conversion device provided in the present embodiment of the present disclosure.

Mode 1: Referring to FIG. 3A, during this stage, the second main switching tube S2, the third main switching tube S3, the second auxiliary tube Ssub2, and the fourth auxiliary tube Ssub4 are conducting (turned on). On the one hand, the power supply charges the first energy storage module LCD Unit through the second main switching tube S2 and the second auxiliary tube Ssub2, and the first energy storage module LCD Unit stores energy. On the other hand, the first bus capacitor Cbus1 supplies energy to the first output load Rl1 via the first filtering module Filto1 through the second main switching tube S2 and the third main switching tube S3.

At the time, the potential difference between points A and B is VAB=−Vcbus1, and the second conversion output circuit performs the freewheeling task through the second auxiliary tube Ssub2 and the fourth auxiliary tube Ssub4, and the potential difference between points C and D is VCD=0. The voltage of the first main switching tube S1 is equal to Vcbus1, the voltage of the first auxiliary tube Ssub1 is equal to Vcbus2, the voltage of the fourth main switching tube S4 is equal to Vcbus1, and the voltage of the third auxiliary tube Ssub3 is equal to Vcbus2.

Figure 3B:
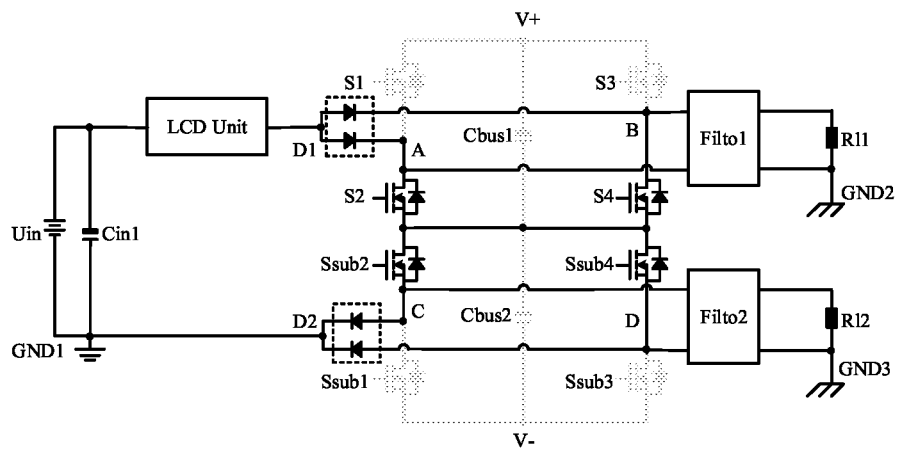

Mode 2: Referring to FIG. 3B, during this stage, the second main switching tube S2, the fourth main switching tube S4, and the second auxiliary tube Ssub2 and the fourth auxiliary tube Ssub4 are conducting. On the one hand, the power supply charges the first energy storage module LCD Unit through the second main switching tube S2 and the second auxiliary tube Ssub2, and charges the first energy storage module LCD Unit through the fourth main switching tube S4 and the fourth auxiliary tube Ssub4. On the other hand, the first conversion output circuit performs the freewheeling task through the second main switching tube S2 and the fourth main switching tube S4, and the potential difference between points A and B is VAB=0. The second conversion output circuit performs the freewheeling task through the second auxiliary tube Ssub2 and the fourth auxiliary tube Ssub4, and the potential difference between points C and D is VCD=0. In this mode, the voltage of the first main switching tube S1 is equal to Vcbus1, the voltage of the first auxiliary tube Ssub1 is equal to Vcbus2, the voltage of the third main switching tube S3 is equal to Vcbus1, and the voltage of the third auxiliary tube Ssub3 is equal to Vcbus2.

Figure 3C:
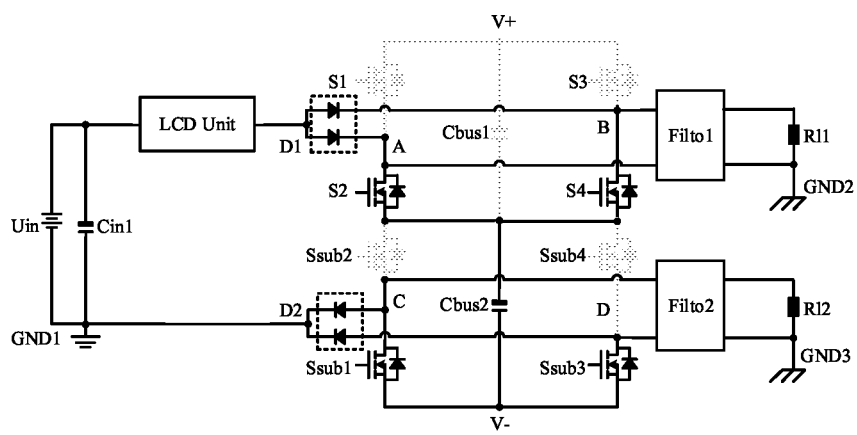

Mode 3: Referring to FIG. 3C, during this stage, the second main switching tube S2, the fourth main switching tube S4, the first auxiliary tube Ssub1, and the third auxiliary tube Ssub3 are conducting. On one hand, the power supply charges the second bus capacitor Cbus2 through the second main switching tube S2 and the first auxiliary tube Ssub1, and charges the second bus capacitor Cbus2 through the fourth main switching tube S4 and the third auxiliary tube Ssub3. The first energy storage module LCD Unit discharges and releases energy. On the other hand, the first conversion output circuit performs the freewheeling task through the second main switching tube S2 and the fourth main switching tube S4. In this mode, the potential difference between points A and B is VAB=0. The second conversion output circuit performs the freewheeling task through the first auxiliary tube Ssub1 and the third auxiliary tube Ssub3, and the potential difference between points C and D is VCD=0. In this mode, the voltage of the first main switching tube S1 is equal to Vcbus1, the voltage of the second auxiliary tube Ssub2 is equal to Vcbus2, the voltage of the third main switching tube S3 is equal to Vcbus1, and the voltage of the fourth auxiliary tube Ssub4 is equal to Vcbus2.

Figure 3D:
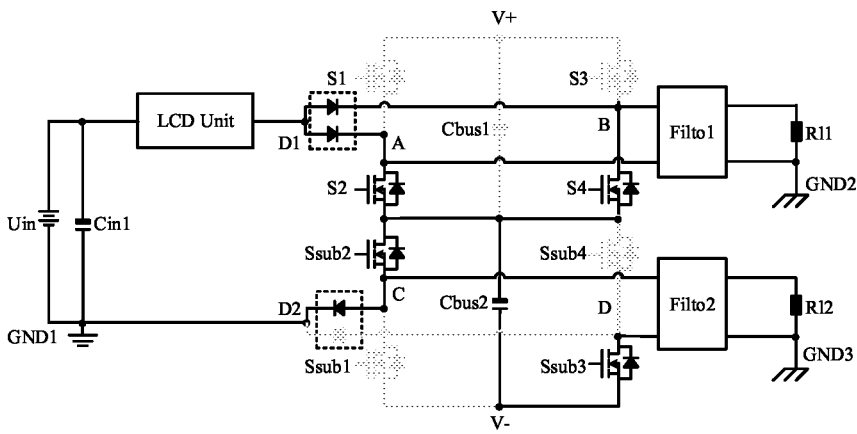

Mode 4: Referring to FIG. 3D, during this stage, the second main switching tube S2, the fourth main switching tube S4, and the second auxiliary tube Ssub2 and Ssub3 are conducting. On one hand, the power supply charges the first energy storage module LCD Unit by the second main switching tube S2 and the second auxiliary tube Ssub2, and the first energy storage module LCD Unit charges and stores energy. On the other hand, the first conversion output circuit performs the freewheeling task through the second main switching tube S2 and the fourth main switching tube S4, and the potential difference between points A and B is VAB=0. The second bus capacitor Cbus2 supplies energy to the second output load R12 through the second auxiliary tube Ssub2 and the third auxiliary tube Ssub3, and the potential difference between points C and D is VCD=Vcbus2. In this stage, the voltage of the first main switching tube S1 is equal to Vcbus1, the voltage of the first auxiliary tube Ssub1 is equal to Vcbus2, the voltage of the third main switching tube S3 is equal to Vcbus1, and the voltage of the fourth auxiliary tube Ssub4 is equal to Vcbus2.

Figure 3E:
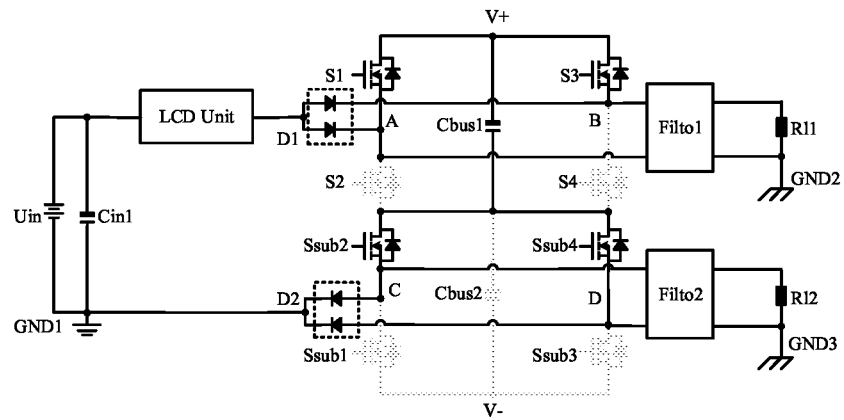

Mode 5: Referring to FIG. 3E, during this stage, the first main switching tube S1, the third main switching tube S3, the second auxiliary tube Ssub2, and the fourth auxiliary tube Ssub4 are conducting. On the one hand, the power supply charges the first bus capacitor Cbus1 through the first main switching tube S1 and the second auxiliary tube Ssub2, and charges the first bus capacitor Cbus1 through the third main switching tube S3 and the fourth auxiliary tube Ssub4; the first energy storage module LCD Unit discharges and releases energy. On the other hand, the first conversion output circuit performs the freewheeling task through the first main switching tube S1 and the third main switching tube S3, and the potential difference between points A and B is VAB=0. The second conversion output circuit performs the freewheeling task through the second auxiliary tube Ssub2 and the fourth auxiliary tube Ssub4, and the potential difference between points C and D is VCD=0. The voltage of the second main switching tube S2 is equal to Vcbus1, the voltage of the first auxiliary tube Ssub1 is equal to Vcbus2, the voltage of the fourth main switching tube S4 is equal to Vcbus1, and the voltage of the third auxiliary tube Ssub3 is equal to Vcbus2.

Figure 3F:
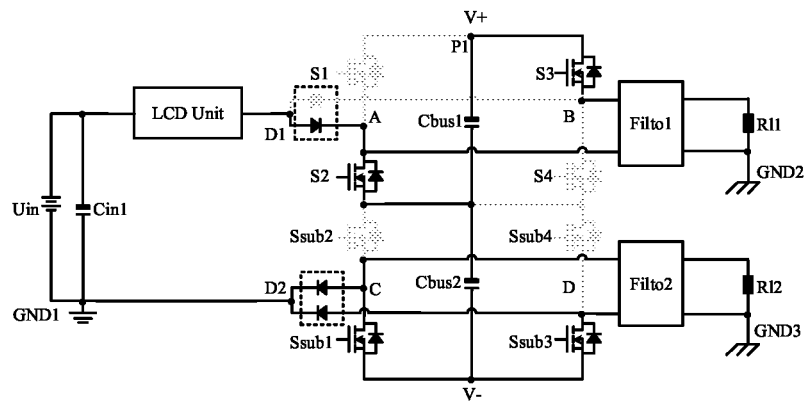

Mode 6: Referring to FIG. 3F, during this stage, the second main switching tube S2, the third main switching tube S3, the first auxiliary tube Ssub1, and the third auxiliary tube Ssub3 are conducting. The first energy storage module LCD Unit releases energy and charges the second bus capacitor Cbus2 through the second main switching tube S2 and the first auxiliary tube Ssub1, and charges the second bus capacitor Cbus2 through the second main switching tube S2 and the third auxiliary tube Ssub3; the first energy storage module LCD Unit discharges and releases energy. On the other hand, the first bus capacitor Cbus1 supplies energy to the first output load R11 through the second main switching tube S2 and the third main switching tube S3, and the potential difference between points A and B is VAB=−Vcbus1. The second conversion output circuit performs the freewheeling task through the first auxiliary tube Ssub1 and the third auxiliary tube Ssub3, and the potential difference between points C and D is VCD=0. The voltage of the first main switching tube S1 is equal to Vcbus1, the voltage of the second auxiliary tube Ssub2 is equal to Vcbus2, the voltage of the fourth main switching tube S4 is equal to Vcbus1, and the voltage of the fourth auxiliary tube Ssub4 is equal to Vcbus2.

Figure 3G:
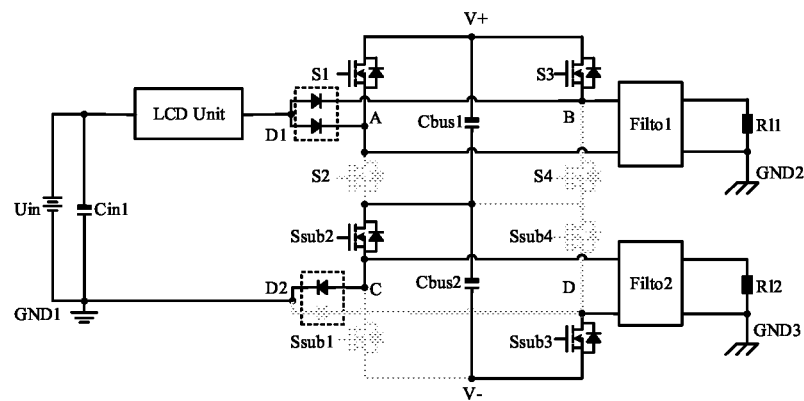

Mode 7: Referring to FIG. 3G, during this stage, the first main switching tube S1, the third main switching tube S3, and the second auxiliary tube Ssub2, and the third auxiliary tube Ssub3 are conducting. On one hand, the power supply charges the first bus capacitor Cbus1 via the first main switching tube S1 and the second auxiliary tube Ssub2, and charges the first bus capacitor Cbus1 via the third main switching tube S3 and the second auxiliary tube Ssub2. The first energy storage module LCD Unit discharges and releases energy. On the other hand, the first conversion output circuit performs a freewheeling task via the first main switching tube S1 and the third main switching tube S3, and the potential difference between points A and B is VAB=0. The second bus capacitor Cbus2 supplies energy to the second output load R12 via the second auxiliary tube Ssub2 and the third auxiliary tube Ssub3, and the potential difference between points C and D is VCD=Vcbus2. The voltage of the second main switching tube S2 is equal to Vcbus1, the voltage of the first auxiliary tube Ssub1 is equal to Vcbus2, the voltage of the fourth main switching tube S4 is equal to Vcbus1, and the voltage of the fourth auxiliary tube Ssub4 is equal to Vcbus2.

Figure 3H:
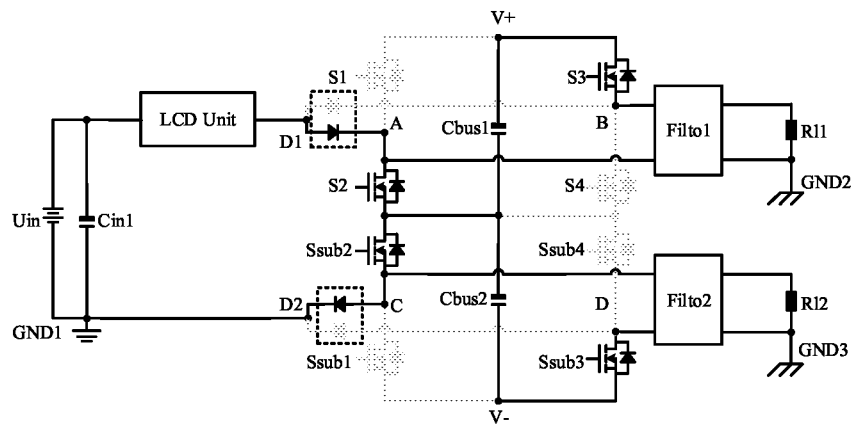

Mode 8: Referring to FIG. 3H, during this stage, the second main switching tube S2, the third main switching tube S3, and the second auxiliary tube Ssub2, and the third auxiliary tube Ssub3 are conducting. On one hand, the power supply charges the first energy storage module LCD Unit via the second main switching tube S2 and the second auxiliary tube Ssub2, and the first energy storage module LCD Unit charges and stores energy. On the other hand, the first bus capacitor Cbus1 supplies energy to the first output load R11 via the second main switching tube S2 and the third main switching tube S3, and the potential difference between points A and B is VAB=−Vcbus1. The second bus capacitor Cbus2 supplies energy to the second output load R12 via the second auxiliary tube Ssub2 and the third auxiliary tube Ssub3, and the potential difference between points C and D is VCD=Vcbus2. During this stage, the voltage of the first main switching tube S1 is equal to Vcbus1, the voltage of the first auxiliary tube Ssub1 is equal to Vcbus2, the voltage of the fourth main switching tube S4 is equal to Vcbus1, and the voltage of the fourth auxiliary tube Ssub4 is equal to Vcbus2.

Through at least six states of the above-mentioned eight working states in different stages, the potential difference VAB between points A and B is always −Vcbus1 or 0 in the sinusoidal positive half cycle, and the potential difference VCD between points C and D is always Vcbus2 or 0, so it is converted into a sinusoidal AC signal after being filtered by the first filter module Filto1 and the second filter module Filto2 on the output side respectively, and output to the subsequent load. Since the bus voltage Vbus=Vcbus1+Vcbus2=1/(1−D)*Vin, where D is the duty ratio of the first fixed pulse width signal Vpwm1 or the second fixed pulse width signal Vpwm2, and Vcbus1=Vcbus2, when D>0.5, Vcbus1=Vcbus2>Vin, that is, the sinusoidal pulse voltages of the two outputs of the first conversion output circuit and the second conversion output circuit are higher than the voltage Vin of the power supply, which is a boost inversion.

Several possible modes in which the bidirectional energy conversion device is in a buck mode are introduced below with reference to FIG. 2B.

Figure 4A:
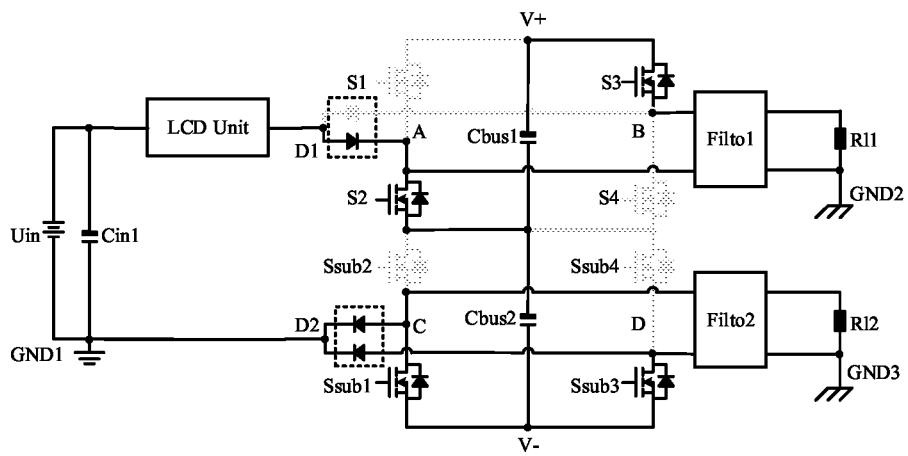
FIGS. 4A to 4E show the buck inverter (D<0.5) operating mode diagrams of the dual output energy conversion device provided in the present embodiment of the present disclosure.

Mode 1: Referring to FIG. 4A, during this stage, the second main switching tube S2, the third main switching tube S3, the first auxiliary tube Ssub1, and the third auxiliary tube Ssub3 are conducting. On the one hand, the second bus capacitor Cbus2 are charged through the second main switching tube S2 and the first auxiliary tube Ssub1, and the second bus capacitor Cbus2 are charged through the second main switching tube S2 and the third auxiliary tube Ssub3, while the first energy storage module LCD Unit discharges and releases energy. On the other hand, the first bus capacitor Cbus1 supplies energy to the first output load R11 through the second main switching tube S2 and the third main switching tube S3, and the potential difference between points A and B is VAB=−Vcbus1. The second conversion output circuit performs the freewheeling task through the first auxiliary tube Ssub1 and the third auxiliary tube Ssub3, and the potential difference between points C and D is VCD=0. The voltage of the first main switching tube S1 is equal to Vcbus1, the voltage of the second auxiliary tube Ssub2 is equal to Vcbus2, the voltage of the fourth main switching tube S4 is equal to Vcbus1, and the voltage of the fourth auxiliary tube Ssub4 is equal to Vcbus2.

Figure 4B:
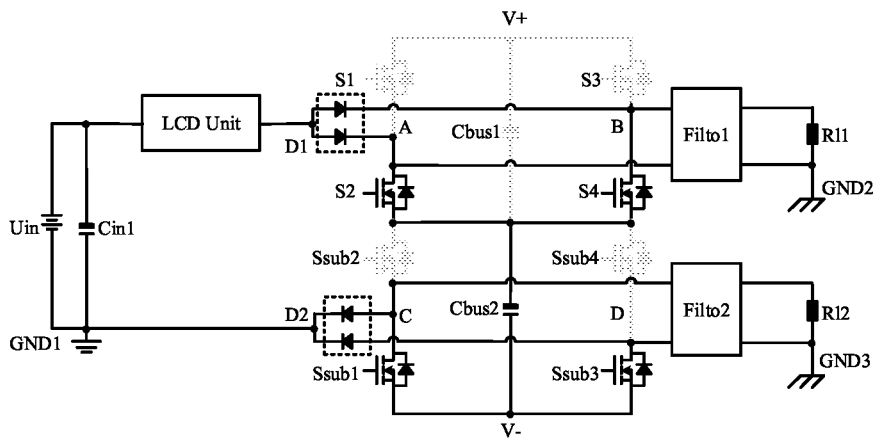

Mode 2: Referring to FIG. 4B, during this stage, the second main switching tube S2, the fourth main switching tube S4, and the first auxiliary tube Ssub1, and the third auxiliary tube Ssub3 are conducting. On the one hand, the power supply charges the second bus capacitor Cbus2 through the second main switching tube S2 and the first auxiliary tube Ssub1, and charges the second bus capacitor Cbus2 through the fourth main switching tube S4 and the third auxiliary tube Ssub3. The first energy storage module LCD Unit discharges and releases energy. On the other hand, the first conversion output circuit performs the freewheeling task through the second main switching tube S2 and the fourth main switching tube S4. In this mode, the potential difference between points A and B is VAB=0. The second conversion output circuit performs the freewheeling task through the first auxiliary tube Ssub1 and the third auxiliary tube Ssub3, and the potential difference between points C and D is VCD=0. In this mode, the voltage of the first main switching tube S1 is equal to Vcbus1, the voltage of the second auxiliary tube Ssub2 is equal to Vcbus2, the voltage of the third main switching tube S3 is equal to Vcbus1, and the voltage of the fourth auxiliary tube Ssub4 is equal to Vcbus2.

Figure 4C:
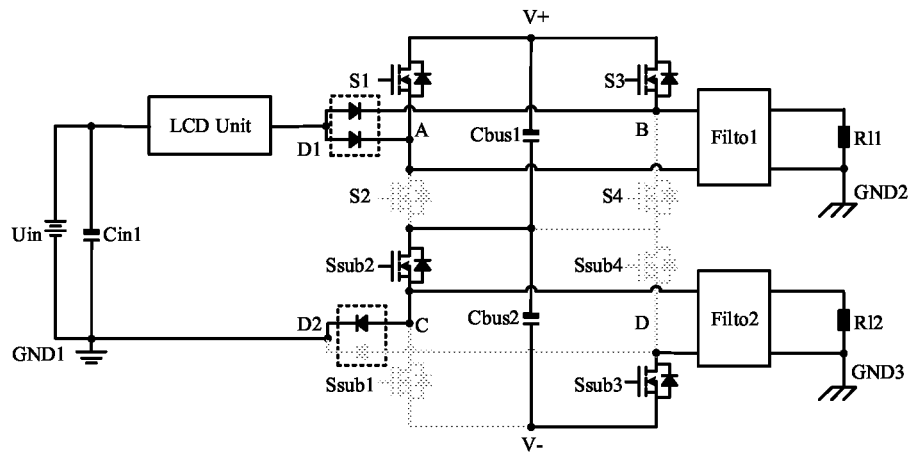

Mode 3: Referring to FIG. 4C, during this stage, the first main switching tube S1, the third main switching tube S3, and the second auxiliary tube Ssub2 and the third auxiliary tube Ssub3 are conducting. On the one hand, the power supply charges the first bus capacitor Cbus1 through the first main switching tube S1 and the second auxiliary tube Ssub2, and charges the first bus capacitor Cbus1 through the third main switching tube S3 and the second auxiliary tube Ssub2. The first energy storage module LCD Unit discharges and releases energy. On the other hand, the first conversion output circuit performs the freewheeling task through the first main switching tube S1 and the third main switching tube S3, and the potential difference between points A and B is VAB=0. The second bus capacitor Cbus2 supplies energy to the second output load R12 through the second auxiliary tube Ssub2 and the third auxiliary tube Ssub3, and the potential difference between points C and D is VCD=Vcbus2. The voltage of the second main switching tube S2 is equal to Vcbus1, the voltage of the first auxiliary tube Ssub1 is equal to Vcbus2, the voltage of the fourth main switching tube S4 is equal to Vcbus1, and the voltage of the fourth auxiliary tube Ssub4 is equal to Vcbus2.

Figure 4D:
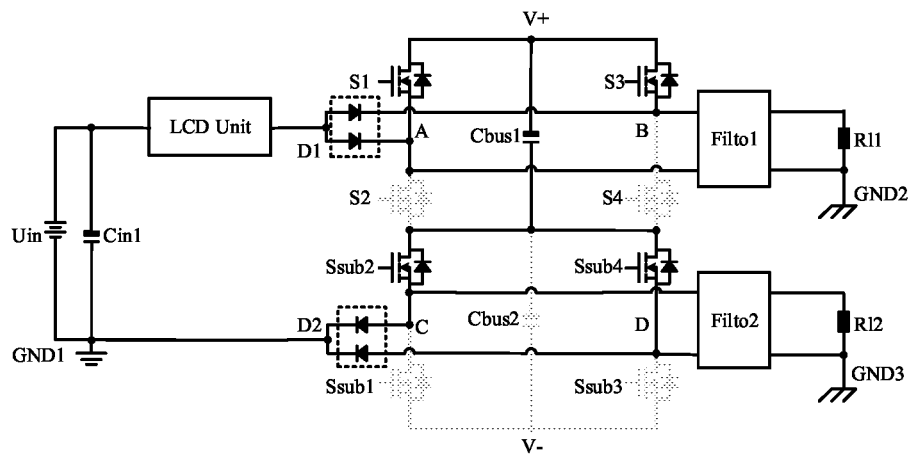

Mode 4: Referring to FIG. 4D, during this stage, the first main switching tube S1, the third main switching tube S3, and the second auxiliary tube Ssub2, and the fourth auxiliary tube Ssub4 are conducting. On the one hand, the power supply charges the first bus capacitor Cbus1 through the first main switching tube S1 and the second auxiliary tube Ssub2, and charges the first bus capacitor Cbus1 through the third main switching tube S3 and the fourth auxiliary tube Ssub4. The first energy storage module LCD Unit discharges and releases energy. On the other hand, the first conversion output circuit performs the freewheeling task through the first main switching tube S1 and the third main switching tube S3, and the potential difference between points A and B is VAB=0. The second conversion output circuit performs the freewheeling task through the second auxiliary tube Ssub2 and the fourth auxiliary tube Ssub4, and the potential difference between points C and D is VCD=0. The voltage of the second main switching tube S2 is equal to Vcbus1, the voltage of the first auxiliary tube Ssub1 is equal to Vcbus2, the voltage of the fourth main switching tube S4 is equal to Vcbus1, and the voltage of the third auxiliary tube Ssub3 is equal to Vcbus2.

Figure 4E:
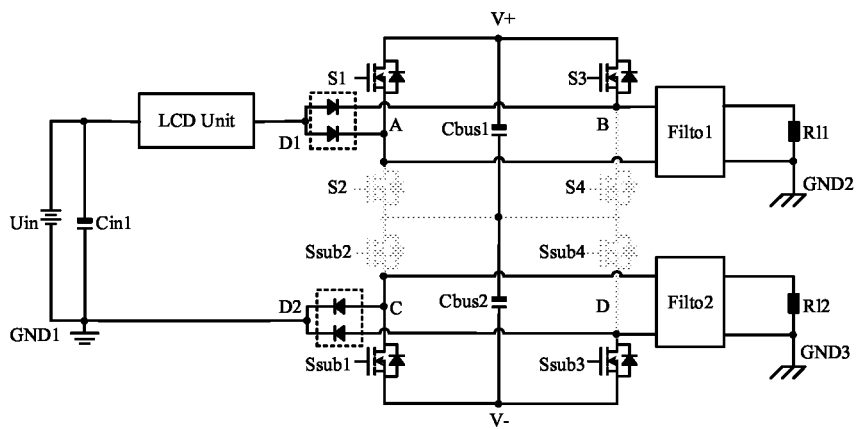

Mode 5: Referring to FIG. 4E, during this stage, the first main switching tube S1, the third main switching tube S3, and the first auxiliary tube Ssub1, and the third auxiliary tube Ssub3 are conducting. On the one hand, the power supply charges the first bus capacitor Cbus1 and the second bus capacitor Cbus2 through the first main switching tube S1 and the first auxiliary tube Ssub1 via the first path, and charges the first bus capacitor Cbus1 and the second bus capacitor Cbus2 through the main switching tube S3 and the fourth auxiliary tube Ssub4 via the second path. The first energy storage module LCD Unit discharges and releases energy. On the other hand, the first conversion output circuit performs the freewheeling task through the first main switching tube S1 and the third main switching tube S3, and the potential difference between points A and B is VAB=0. The second conversion output circuit performs the freewheeling task through the first auxiliary tube Ssub1 and the third auxiliary tube Ssub3, and the potential difference between points C and D is VCD=0. The voltage of the second main switching tube S2 is equal to Vcbus1, the voltage of the second auxiliary tube Ssub2 is equal to Vcbus2, the voltage of the fourth main switching tube S4 is equal to Vcbus1, and the voltage of the fourth auxiliary tube Ssub4 is equal to Vcbus2.

Through the working states of the above five different stages, in the sinusoidal positive half cycle, the potential difference VAB between points A and B is always −Vcbus1 or 0, and the potential difference VCD between points C and D is always Vcbus2 or 0, so that, after being filtered by the first filter module Filto1 and the second filter module Filto2 on the output side, they are converted into sinusoidal AC signals and output to the subsequent load. Since the bus voltage Vbus=Vcbus1+Vcbus2=1/(1−D)*Vin, and Vcbus1=Vcbus2, when D<0.5, Vcbus1=Vcbus2<Vin, that is, the sinusoidal pulse voltages output by the first conversion output circuit and the second conversion output circuit are not higher than the voltage Vin of the power supply, which is a buck inversion.

Combining the principles of boost-type and buck-type inversion, regardless of the working state of the dual output energy conversion device provided in this embodiment, the voltage stress of the main switching tube and the auxiliary tube is half of the bus voltage Vbus, that is, the circuit may reduce the voltage stress of the device, and the output voltage of the two output circuits may be lower than Vcbus1 (or Vcbus2) or higher than Vcbus1 (or Vcbus2), so that the input voltage Vin and the output voltage have a buck-boost adjustment capability.

In a possible implementation, the main switching tubes S1 to S4 and auxiliary tubes Ssub1 to Ssub4 in the dual output energy conversion device provided in this embodiment are all Group-III nitride transistors, which may be field effect transistors (FETs) such as high electron mobility transistors (HEMTs), heterojunction field effect transistors (HFETs), POLFETs, JFETs, MESFETs, CAVETs, or any other Group-III nitride transistor structure suitable for power switching applications.

Figure 5A:
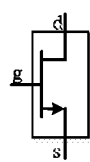
FIGS. 5A to 5C show schematic diagrams of switching tubes.
Figure 5B:
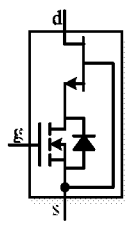
Figure 5C:
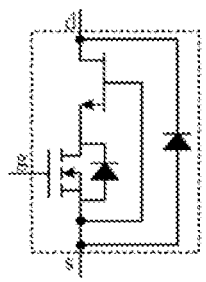

In some implementations, the Group-III nitride transistors are enhancement-type (E-type) devices, as shown in FIG. 5A, that is normally-off devices with a threshold voltage greater than 0V, for example, about 1.5V-2V or greater than 2V. When using the enhancement-type (E-type) device, a reverse body diode is not contained, which may reduce the conduction loss of the power supply device when the device is in reverse flow. In other possible implementations, the Group-III nitride transistor is composed of a high-voltage Group-III nitride depletion-type (D-type) transistor and a low-voltage enhancement-type (E-type) transistor being cascaded, connected as shown in FIG. 5B. The depletion-type (D-type) device, that is, a normally-on device, makes the threshold voltage less than 0V, and the low-voltage enhancement-type (E-type) transistor may be a low-voltage S1 MOS device. In some embodiments, the Group-III nitride transistors of FIG. 5B further include an external reverse parallel diode to reduce the device reverse recovery loss, as shown in FIG. 5C.

In some implementations, Group-III nitride transistors are high voltage switching transistors. As the switching transistor used in this embodiment, the high voltage switching transistor is a transistor optimized for high voltage switching applications, that is, when the transistor is off, a high voltage can be blocked, such as about 300V, or higher about 600V, or higher about 1200V or higher, and when the transistor is on, it has a sufficiently low on-resistance for the above-mentioned applications, i.e., low conduction losses are achieved when a large amount of current is passed through the device.

Figure 6:
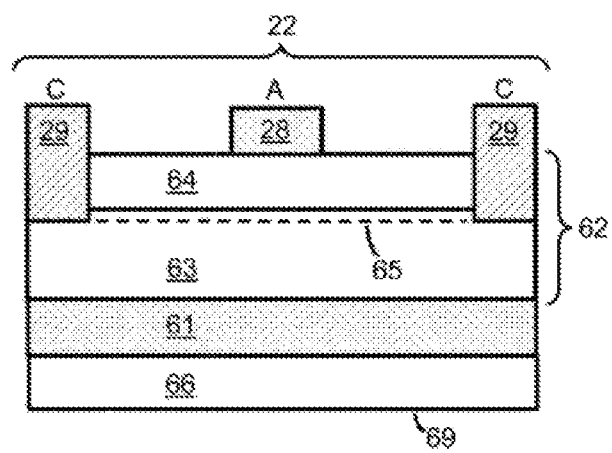
FIG. 6 shows a schematic cross-sectional view of a Group-III nitride diode provided in the present embodiment of the present disclosure.

In some embodiments, the reverse flow preventing modules in the dual output energy conversion device are Group-III nitride rectifier devices. The Group-III nitride rectifier device may be at least two lateral Group-III nitride diodes having an insulating or semi-insulating portion on the opposite side of the semiconductor body with respect to all electrodes, such as the Group-III nitride diode shown in FIG. 6. The Group-III nitride diode in FIG. 6 includes an insulating or semi-insulating portion 61, a semiconductor body 62 comprising a Group-III nitride buffer layer 63 (such as GaN), a Group-III nitride barrier layer 64 (such as AlGaN), and a two-dimensional electron gas (2DEG) channel 65, an anode contact 28 contacting the semiconductor body 62 on the opposite side of the insulating or semi-insulating portion 61 and formed in Schottky contact with the semiconductor material of the semiconductor body 62, and a cathode contact 29 formed in ohmic contact with the 2DEG channel 65. The Group-III nitride diode may include a conductive or semi-conductive portion 66, such as a silicon substrate.

Figure 7A:
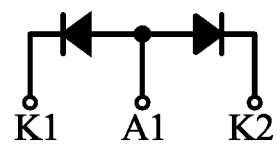
FIGS. 7A to 7B show schematic diagrams of the electrical connections of Group-III nitride rectifiers provided in the present embodiment of the present disclosure.
Figure 7B:
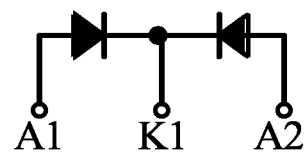

In a possible implementation, the Group-III nitride diodes in the Group-III nitride rectifier device may be connected in a common anode configuration, as shown in FIG. 7A, or a common cathode configuration, as shown in FIG. 7B.

Figure 8A:
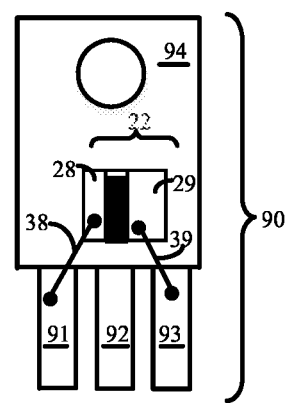
FIGS. 8A to 8B show plan sectional views of the Group-III nitride rectifiers provided in the present embodiment of the present disclosure.

In some embodiments, the Group-III nitride rectifier device is constructed by two independent packages of Group-III nitride diodes that are electrically connected externally. The independent package of Group-III nitride diodes is shown in FIG. 8A. The plan view of FIG. 8A illustrates multiple portions of the package and electronic components packaged or sealed within the package. The electronic component 90 includes a single Group-III nitride diode 22 that is packaged, encapsulated, or sealed within the independent package. The independent package includes multiple sealed structural portions, such as a package base 94, and non-structural portions, such as pins 91, 92, and 93. As used herein, the "structural portion" of the package is the portion that forms the basic shape of the package, is formed or molded to provide the package with the necessary structural rigidity to protect the encapsulated device. In most cases, when an electronic component including a package is used in a discrete circuit, the structural portion of the package is directly mounted to the circuit or circuit board. In the independent package of FIG. 8A, the package base 94 is formed of a conductive material, that is, the package base 94 is the conductive structural portion of the package. A single package includes at least two pins, an anode pin 91 and a cathode pin 93, and may include at least one other pin, such as an open pin 92. Pins 91 to 93 are all formed of conductive materials. When an open pin 92 is included, it may be electrically connected to the package base 94 or electrically insulated from the package base 94, and all other pins are electrically insulated from the package base. As used herein, if two or more contacts or other items are connected by a material that is sufficiently conductive to ensure that the potential at each of the contacts or other items is always the same, i.e., approximately the same, under any bias condition, the two or more contacts or other items are then referred to be "electrically connected".

When the Group-III nitride diode 22 is used for a Group-III nitride rectifier device, the Group-III nitride diode 22 is mounted inside a single package, and connected in such a way that single or multiple wire bonded electrical bond wires 38-39 may be used to electrically connect portions of the package and Group-III nitride diode 22 to each other. Therein, the corresponding insulated or semi-insulated substrate of the Group-III nitride diode 22 is in contact with the package base 94. The cathode contact 29 of the Group-III nitride diode 22 is electrically connected to the conductive structural portion of the package, such as the package base 94, or alternatively to the cathode pin 93 of the package through a conductive wire bond 39. The anode contact 28 of the Group-III nitride diode 22 is electrically connected to the anode pin 91 of the package for instance through a conductive wire bond 38.

Figure 8B:
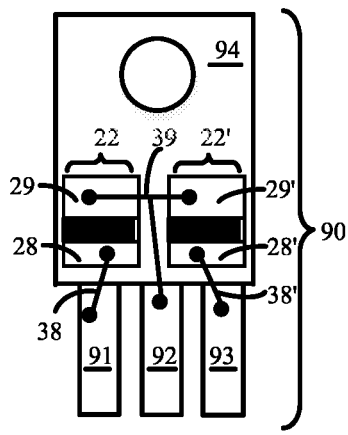

In some other embodiments, the Group-III nitride rectifier device is composed of a dual-tube package of Group-III nitride diodes, as shown in FIG. 8B, in which a plan view illustrates multiple portions of the package and electronic devices packaged or sealed within the package. The electronic component 90' includes Group-III nitride diodes 22 and 22' that are packaged, encapsulated, or sealed within the dual-tube package. The dual-tube package includes multiple sealed structural portions, such as the package base 94, and non-structural portions, such as pins 91, 92, and 93. The "structural portion" of the package used herein is the portion that forms the basic shape of the package and provides structural rigidity for the package to protect the encapsulated devices. In most cases, when an electronic component including a package is used in a discrete circuit, the structural portion of the package is directly mounted to the circuit or circuit board. In the dual-tube package of FIG. 8B, the package base 94 is formed of a conductive material, that is, the package base 94 is the conductive structural portion of the package. A single package includes at least three pins, an anode pin 91, an anode pin 93, and a common cathode pin 92. Pins 91 to 93 are all formed of conductive materials. The common cathode pin 92 may be electrically connected to the package base 94 or electrically insulated from the package base 94, and all other pins are electrically insulated from the package base. As used herein, if two or more contacts or other items are connected by a material that is sufficiently conductive to ensure that the potential at each of the contacts or other items is always the same, i.e., approximately the same, under any bias condition, the two or more contacts or other items are then referred to be "electrically connected".

When the Group-III nitride diode is used for a Group-III nitride rectifier device, the Group-III nitride diodes 22 and 22' are mounted inside a dual-tube package, and connected in such a way that single or multiple wire bonded electrical bond wires 38, 38', 39 may be used to electrically connect portions of the package and Group-III nitride diodes 22 and 22' to each other. Therein, the corresponding insulated or semi-insulated substrates of the Group-III nitride diodes 22 and 22' are in contact with the package base 94. The cathode contact 29 of the Group-III nitride diode 22 and the cathode contact 29' of the Group-III nitride diode 22' are electrically connected to the conductive structural portion of the package, such as the package base 94, and further to the common cathode pin 92 of the package through a conductive wire bond 39. The anode contact 28 of the Group-III nitride diode 22 is electrically connected to the anode pin 91 of the package for instance through a conductive wire bond 38, and the anode contact 28' of the Group-III nitride diode 22' is electrically connected to the anode pin 93 of the package for instance through a conductive wire bond 38'.

Figure 10A:
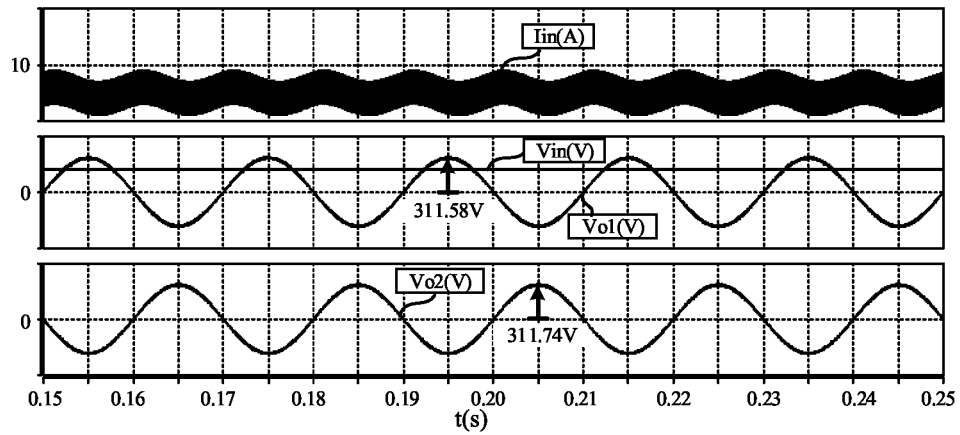
FIGS. 10A to 10C show schematic experimental results of the dual output energy conversion device provided in the present embodiment of the present disclosure.
Figure 10B:
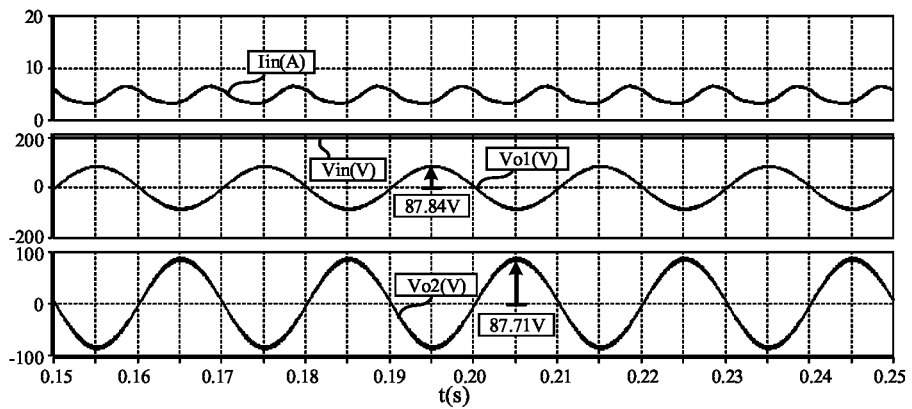
Figure 10C:
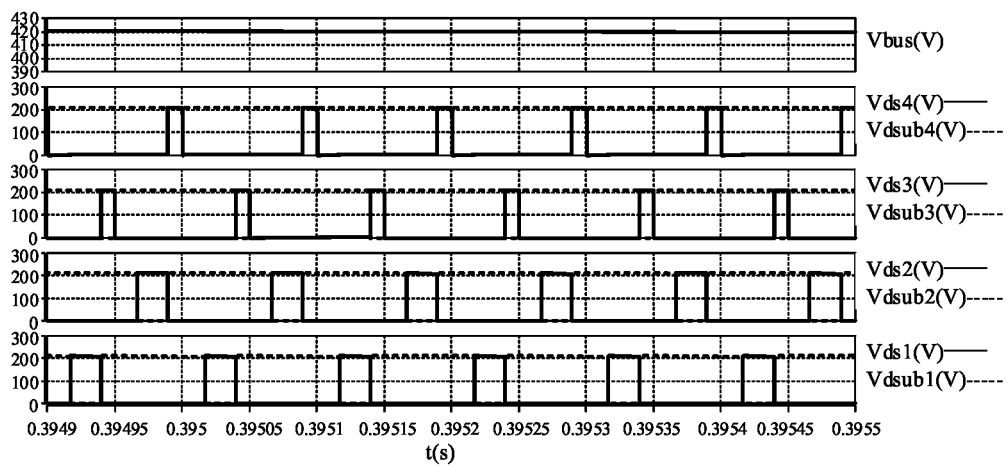

The experimental results of the dual output energy conversion device are shown in FIGS. 10A to 10C. FIG. 10A shows the waveforms of the first input DC power supply Uin current Iin, first input DC power supply Uin voltage Vin, first output voltage Vo1, and second output voltage Vo2 of the dual output energy conversion device in the boost-type inversion (Vin=200V, Po=1000 W). It can be seen that the voltage Vo1 (311.58V) at the first output load R11 and the voltage Vo2 (311.74V) at the second output load R12 are both higher than the first input DC power supply Uin voltage Vin.

FIG. 10B shows the waveforms of the first input DC power supply Uin current Iin, first input DC power supply Uin voltage Vin, first output voltage Vo1, and second output voltage Vo2 of the dual output energy conversion device in the buck-type inversion (Vin=200V, Po=1000 W). It can be seen that the voltage Vo1 (87.84V) at the first output load R11 and the voltage Vo2 (87.71V) at the second output load R12 are both lower than the first input DC power supply Uin voltage Vin.

Referring to FIG. 10C, it illustrates the bus voltage Vbus of the dual output energy conversion device, the voltage stress of the main switching tubes S1-S4, and the voltage stress of the three-level auxiliary tubes Ssub1-Ssub4. It can be seen that the voltage stresses of all main switching tubes and auxiliary tubes are half of the bus voltage Vbus, which may reduce the voltage stress of the device.

The present embodiment further provides a power supply device, which includes the dual output energy conversion device provided in the above embodiment.

The above is only specific embodiments of the present disclosure, and the protection scope of the present disclosure is not limited to this. Any changes or substitutions that can be easily conceived by those skilled in the art within the technical scope disclosed in the present disclosure should be included in the protection scope of the present disclosure. Therefore, the protection scope of the present disclosure should be determined by the scope of the claims.

What is claimed is:

1. A dual output energy conversion device, wherein the dual output energy conversion device comprises:
   a first energy storage module, a first combined series bridge arm module, a capacitive energy storage module, and a second combined series bridge arm module;
   wherein the first energy storage module, the first combined series bridge arm module, the capacitive energy storage module, and the second combined series bridge arm module are connected in sequence;
   wherein the first combined series bridge arm module comprises a first main switching tube bridge arm unit and a first auxiliary tube bridge arm unit connected in series;
   wherein the second combined series bridge arm module comprises a second main switching tube bridge arm unit and a second auxiliary tube bridge arm unit connected in series;
   wherein the first main switching tube bridge arm unit and the second main switching tube bridge arm unit form a first conversion output circuit, outputting energy of the first energy storage module and/or the capacitive energy storage module to a first subsequent load; and wherein the first auxiliary tube bridge arm unit and the second auxiliary tube bridge arm unit form a second conversion output circuit, outputting energy of the first energy storage module and/or the capacitive energy storage module to a second subsequent load.

2. The dual output energy conversion device according to claim 1, wherein the first main switching tube bridge arm unit comprises a first main switching tube and a second main switching tube, and wherein the first main switching tube is connected in series with the second main switching tube;

wherein the second main switching tube bridge arm unit comprises a third main switching tube and a fourth main switching tube, and wherein the third main switching tube is connected in series with the fourth main switching tube;

wherein the capacitive energy storage module comprises a first bus capacitor, wherein a first end of the first bus capacitor is electrically connected to the first main switching tube and the third main switching tube, and wherein a second end of the first bus capacitor is electrically connected to the second main switching tube and the fourth main switching tube;

wherein the first conversion output circuit comprises a first output terminal and a second output terminal, wherein the first output terminal is formed at midpoint of the first main switching tube bridge arm unit, and wherein the second output terminal is formed at midpoint of the second main switching tube bridge arm unit; and wherein the first main switching tube, the second main switching tube, the third main switching tube, and the fourth main switching tube are used to switch conduction state according to a first driving signal, so that energy of the first energy storage module and the first bus capacitor is outputted through the first output terminal and the second output terminal as a first alternating signal to the first subsequent load.

3. The dual output energy conversion device according to claim 2, wherein the first auxiliary tube bridge arm unit comprises a first auxiliary tube and a second auxiliary tube, and wherein the first auxiliary tube is connected in series with the second auxiliary tube;

wherein the second auxiliary tube bridge arm unit comprises a third auxiliary tube and a fourth auxiliary tube, and wherein the third auxiliary tube is connected in series with the fourth auxiliary tube;

wherein the capacitive energy storage module comprises a second bus capacitor connected in series with the first bus capacitor, and wherein a first end of the second bus capacitor is electrically connected to a second end of the first bus capacitor;

wherein the first end of the second bus capacitor is further electrically connected to the second auxiliary tube and the fourth auxiliary tube, and wherein the second end of the second bus capacitor is electrically connected to the first auxiliary tube and the third auxiliary tube;

wherein the second conversion output circuit comprises a third output terminal and a fourth output terminal, wherein the third output terminal is formed at midpoint of the first auxiliary tube bridge arm unit, and wherein the fourth output terminal is formed at midpoint of the second auxiliary tube bridge arm unit; and wherein the first auxiliary tube, the second auxiliary tube, the third auxiliary tube and the fourth auxiliary tube are used to switch conduction state according to a second driving signal, so that energy of the first energy storage module and the second bus capacitor is outputted through the third output terminal and the fourth output terminal as a second alternating signal to the second subsequent load.

4. The dual output energy conversion device according to claim 3, wherein the dual output energy conversion device further comprises a first filtering module and a second filtering module;

wherein the first filtering module is electrically connected to the output terminal of the first conversion output circuit, and is used to convert the first alternating signal output by the first conversion output circuit into a standard sinusoidal signal; and wherein the second filtering module is electrically connected to the output terminal of the second conversion output circuit, and is used to convert the second alternating signal output by the second conversion output circuit into a standard sinusoidal signal.

5. The dual output energy conversion device according to claim 3, wherein the dual output energy conversion device comprises a first reverse flow preventing module; and wherein the first reverse flow preventing module is arranged between the first energy storage module and the first conversion output circuit, and the first reverse flow preventing module is used to prevent energy backflow of the first conversion output circuit.

6. The dual output energy conversion device according to claim 3, wherein the dual output energy conversion device comprises a second reverse flow preventing module; and wherein the second reverse flow preventing module is arranged between the second conversion output circuit and negative pole of a power supply, and the second reverse flow preventing module is used to prevent energy backflow of the second conversion output circuit.

7. The dual output energy conversion device according to claim 1, wherein the first energy storage module is arranged between a positive pole of the power supply and the first conversion output circuit; and wherein the first energy storage module comprises at least one diode, and the first energy storage module further comprises at least one of an inductor and a capacitor.

8. The dual output energy conversion device according to claim 1, wherein the first combined series bridge arm module comprises first switch tubes, and the second combined series bridge arm module comprises second switch tubes, wherein the first and second switch tubes are Group-III nitride transistors.

9. A modulation method, wherein the modulation method is applied to the dual output energy conversion device according to claim 1, and wherein the modulation method comprises:

comparing a first modulated wave input signal with a first carrier input signal and a second carrier input signal to generate a first sinusoidal pulse width signal and a second sinusoidal pulse width signal;

comparing a second modulated wave input signal with the first carrier input signal and the second carrier input signal to generate a second fixed pulse width signal and a second fixed pulse width signal;

generating a first zero-crossing point detection signal and a second zero-crossing point detection signal by comparing the first modulated wave input signal and the second modulated wave input signal with a driving reference ground signal respectively;

generating a first plurality of drive signals of the first conversion output circuit (Vgs1-Vgs4) through a first combinational logic module according to the first sinusoidal pulse width signal, a first fixed pulse width signal and the first zero-crossing point detection signal;

generating a second plurality of drive signals of the second conversion output circuit (Vgsub1-Vgsub4) through a second combinational logic module according to the second sinusoidal pulse width signal, a second fixed pulse width signal and the second zero-crossing point detection signal;

driving the first conversion output circuit according to the first plurality of drive signals of the first conversion output circuit (Vgs1-Vgs4); and driving the second conversion output circuit according to the second plurality of drive signals of the second conversion output circuit (Vgsub1-Vgsub4);

wherein a phase difference between the first carrier input signal and the second carrier input signal is 180°.

10. A power supply device, wherein the power supply device comprises the dual output energy conversion device according to claim 1.

* * * * *